(12) United States Patent
Noelle

(10) Patent No.: US 8,029,252 B2
(45) Date of Patent: Oct. 4, 2011

(54) ELECTRIC POWER CONNECTION FOR ELECTRICALLY ASSISTED TURBOCHARGER

(75) Inventor: Phillipe Noelle, Vincey (FR)

(73) Assignee: Honeywell International Inc., Morristown, NJ (US)

( * ) Notice: Subject to any disclaimer, the term of this patent is extended or adjusted under 35 U.S.C. 154(b) by 974 days.

(21) Appl. No.: 10/567,509

(22) PCT Filed: Sep. 5, 2003

(86) PCT No.: PCT/EP03/09877
§ 371 (c)(1),
(2), (4) Date: Feb. 7, 2006

(87) PCT Pub. No.: WO2005/024202
PCT Pub. Date: Mar. 17, 2005

(65) Prior Publication Data
US 2009/0016911 A1    Jan. 15, 2009

(51) Int. Cl.
F04B 17/00    (2006.01)
F04B 35/00    (2006.01)

(52) U.S. Cl. ..................................... 417/407; 417/410.1

(58) Field of Classification Search .............. 290/52; 417/410.1, 423.14, 423.7, 423.1, 423.3, 360, 417/237, 411, 350; 310/71; 60/607
See application file for complete search history.

(56) References Cited

U.S. PATENT DOCUMENTS

| | | | | |
|---|---|---|---|---|
| 3,350,587 A * | 10/1967 | Turk | ............... | 310/71 |
| 4,253,031 A * | 2/1981 | Frister | ............... | 290/52 |
| 4,773,829 A * | 9/1988 | Vettori | ............... | 417/366 |
| 5,147,229 A * | 9/1992 | Nestor | ............... | 439/843 |
| 5,857,332 A | 1/1999 | Johnston et al. | | |
| 5,870,894 A * | 2/1999 | Woollenweber et al. | ....... | 60/607 |
| 5,895,207 A * | 4/1999 | Burgdorf et al. | ........... | 417/410.1 |
| 5,904,471 A * | 5/1999 | Woollenweber et al. | ..... | 417/371 |
| 5,906,098 A | 5/1999 | Woollenweber et al. | | |
| 6,032,466 A | 3/2000 | Woollenweber et al. | | |
| 6,059,381 A * | 5/2000 | Bayer | ............... | 303/119.3 |
| 6,102,672 A * | 8/2000 | Woollenweber et al. | ..... | 417/366 |
| 6,145,314 A * | 11/2000 | Woollenweber et al. | ....... | 60/607 |
| 6,241,489 B1 * | 6/2001 | Lewin et al. | ............... | 417/410.1 |
| 6,443,715 B1 * | 9/2002 | Mayleben et al. | .......... | 417/423.1 |
| 6,449,950 B1 * | 9/2002 | Allen et al. | ............... | 60/607 |
| 6,571,558 B2 * | 6/2003 | Finger et al. | ............... | 60/605.1 |
| 6,945,757 B2 * | 9/2005 | Hartel et al. | ............... | 417/360 |
| 7,352,077 B2 * | 4/2008 | Shibui et al. | ............... | 290/52 |
| 2002/0040581 A1 | 4/2002 | Finger et al. | | |
| 2003/0223892 A1 * | 12/2003 | Woollenweber | ............... | 417/407 |

OTHER PUBLICATIONS

PCT ISR, May 1, 2004, Honeywell.

* cited by examiner

Primary Examiner — Devon C Kramer
Assistant Examiner — Amene Bayou
(74) Attorney, Agent, or Firm — Brian Pangrle

(57) ABSTRACT

A turbocharger includes a compressor housing (2) for accommodating a compressor wheel (5) drivable by an electric motor (21) and an electric motor (21) for driving a compressor wheel (5) accommodated in a compressor housing, the electric motor being supplied with electric power through at least one motor plug connector (12). The turbocharger further comprises a turbine housing (4), a center housing (3) for accommodating a shaft (6). The compressor wheel is driven by the turbine wheel (8) via the shaft (16) and can additionally be driven by the electric motor, where the compressor housing further includes at least one main power plug connector (16) disposed on an axial side of the compressor housing, facing the electric motor.

40 Claims, 7 Drawing Sheets

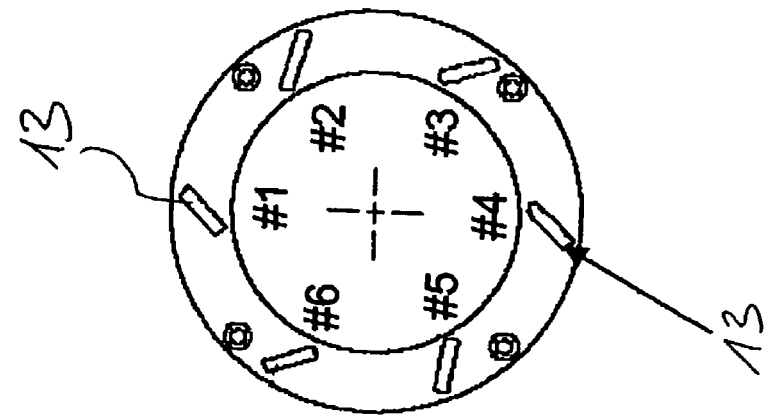
Fig. 7
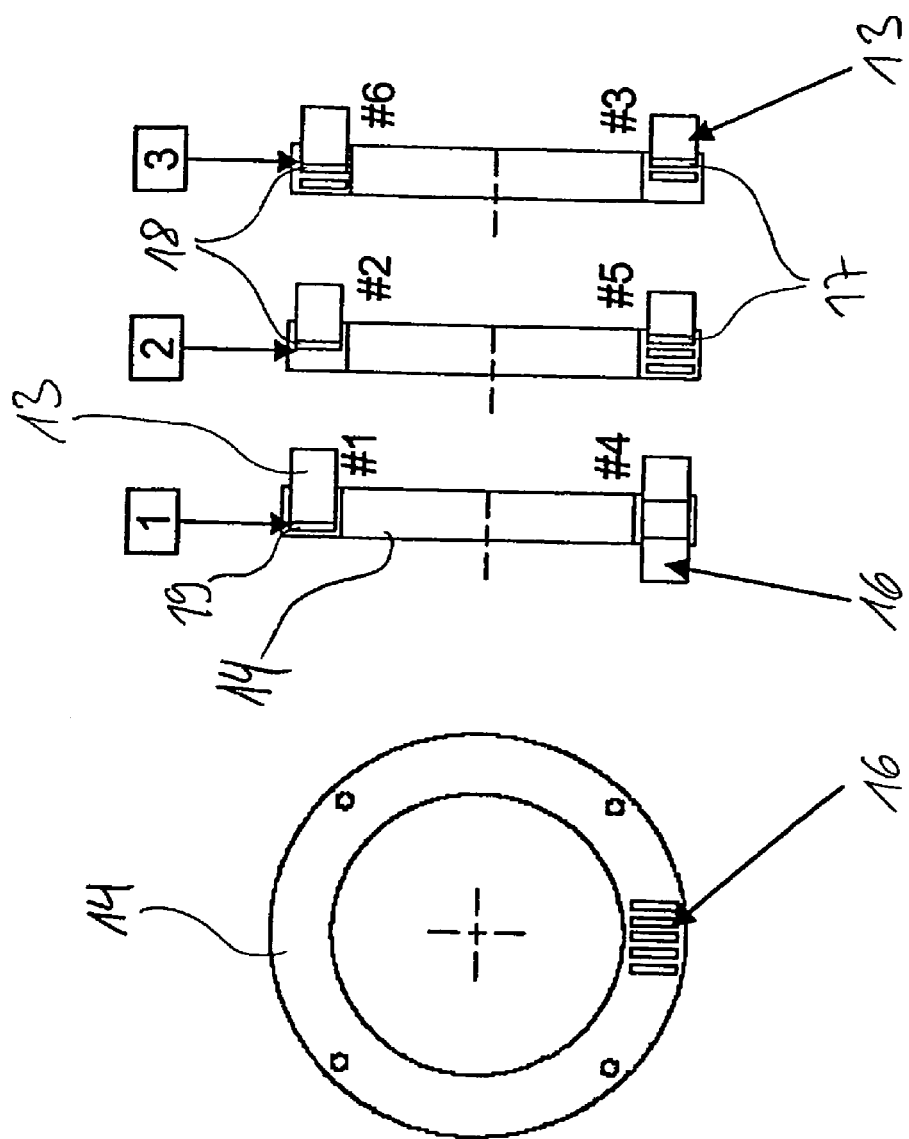
Fig. 8a, b, c
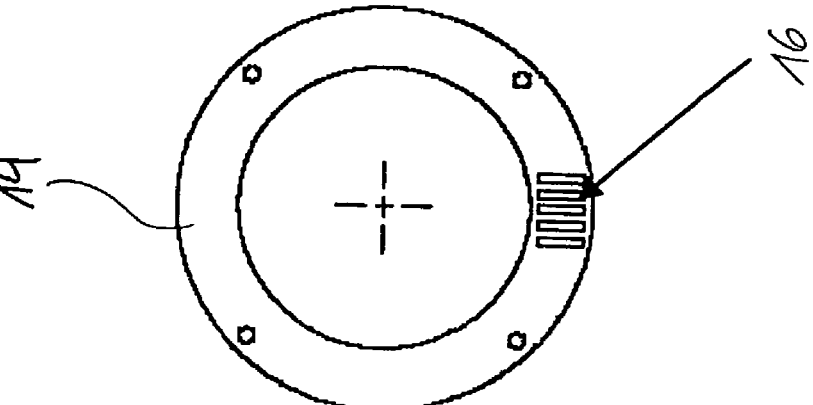
Fig. 6

ELECTRIC POWER CONNECTION FOR ELECTRICALLY ASSISTED TURBOCHARGER

The invention relates to an electric motor and a compressor housing both being connectable via plug connectors for power supply, and to a turbocharger comprising the electric motor and the compressor housing for electrically assisted compression of air for an engine.

Turbochargers are well known and widely used in connection with combustion engines. Exhaust gas from the engine is supplied to and drives a turbine wheel which drives a compressor wheel. The compressor wheel compresses air and discharges it into combustion chambers of respective cylinders. The thus compressed air contains a larger amount of oxygen to enhance the combustion of fuel and thus to generate more power. However, as exhaust gas having less energy is supplied to the turbine wheel when the rotation speed of the engine is low, the pressure increase of the air supplied to the combustion chambers is low. This results in a so-called "turbo-lag" for low engine speed ranges in which an engine output is low. A known solution for overcoming this turbo-lag is to provide an electric motor for the turbocharger which accelerates the compressor wheel when the rotational speed of the engine is low for ensuring the pressure of the air supplied to the combustion chambers.

In the international application No. PCT/EP 03/03934, there is described a turbocharger shown in FIG. 10 having an electric motor for assisting the rotation of a rotor. The turbocharger has a shaft carrying a turbine wheel accommodated in a turbine housing and a compressor wheel accommodated in a compressor housing. The shaft is supported by a bearing accommodated in a center housing and the electric motor is accommodated in an electric motor cartridge inserted into the center housing and fixed by the compressor housing. The electric motor is supplied with power through lead wires which pass through the cartridge and through the center housing in a substantially radial direction. As shown in FIG. 11, this may result in an arrangement of the lead wires such that they are exposed to sharp edges of the center housing and pass through a cooling water cavity of the center housing. This arrangement thus bears the risk of short circuit. Besides, the assembly of the lead wires to the center housing is cumbersome.

Accordingly, there is a need to provide an improved power connection for an electric motor in a turbocharger.

According to one aspect of the invention, the above need is met with an electric motor having the features of claim 1. Modifications of the electric motor are set forth in the subclaims 2 to 9.

According to another aspect of the invention, the above need is met with a compressor housing having the features of claim 10. Modifications of the compressor housing are set forth in the subclaims 11 to 22.

According to a further aspect of the invention, the above need is met with a turbocharger having the features of one of claims 23, 32, 45 and 46. Modifications of the turbocharger are set forth in the subclaims 24 to 31 and 33 to 44, respectively.

In an exemplary embodiment of the invention an electric motor for driving a compressor wheel accommodated in a compressor housing is supplied with electric power through at least one motor plug connector, wherein said motor plug connector is disposed on an axial side of said electric motor facing said compressor housing. With this arrangement, the motor plug connector does not interfere with a center housing into which the electric motor is inserted. A water cavity for cooling the center housing accommodating said electric motor can be formed according to cooling requirement without being limited by the plug connector. This brings an improved cooling performance. Additionally, the assembly of the electric motor into the center housing is simplified since there is no need of threading lead wires for the power connection of the electric motor through one or more holes of the center housing. Additionally, since the plug connector is disposed on the axial side of the electric motor and does not pass the center housing, there is no need to pass boundary conditions for the guidance of the lead wires, e.g. like sharp edges, at which a short circuit of the lead wires may occur.

According to exemplary embodiments of the electric motor, the motor plug connector may be formed as a male plug connector or as a female plug connector.

Furthermore, a plurality of said motor plug connectors can be arranged at equal angular intervals on a circle around the axis of the electric motor.

The motor plug connectors may be blade-shaped and may extend in an axial direction of the electric motor. Additionally, the motor plug connectors can be slanted with respect to the radial direction of the electric motor. This makes it possible to arrange the motor plug connectors with respect to the air flow into a compressor housing volute for providing optimal fluidic characteristics.

In an exemplary embodiment the electric motor is provided with six motor plug connectors each of which is a connector to a lead wire.

The electric motor may be accommodated in an electric motor cartridge, wherein said at least one motor plug connector penetrates the electric motor cartridge. Thus the advantages provided by the electric motor cartridge can be combined with the advantages obtained by the arranging the motor plug connectors on the axial side of the electric motor which faces the axial side of the compressor housing.

In another exemplary embodiment of the invention a compressor housing is provided for accommodating a compressor wheel drivable by an electric motor, wherein said compressor housing comprises at least one main power plug connector connectable to an electric power source and at least one housing plug connector electrically connected to the at least one main power plug connector for supplying said electric motor with electric power, wherein said housing plug connector is disposed on an axial side of said compressor housing, facing said electric motor. Such a compressor housing makes it possible to provide power from a power source to the electric motor of a turbocharger through the compressor housing. Accordingly, there is no need to pass a central housing, so that the related advantages as set forth above are obtained. Furthermore, the main power connector is at a low temperature area, namely at the compressor housing inlet, and the plug connectors are also at a low temperature area, namely at the compressor housing diffuser. Thus, an overheating of the power connection is prevented.

According to exemplary embodiments of the compressor housing said main power plug connector and/or said housing plug connector may be formed as a female plug connector or as a male plug connector.

In the compressor housing said main power plug connector may be connected to said housing plug connector via a printed circuit board. Additionally, a plurality of said housing plug connectors can be arranged at equal intervals on a circle around the axis of the compressor housing and a plurality of said main power plug connectors may be arranged as a bundle on the side of the printed circuit board opposite to the side thereof where the housing plug connectors are disposed. The use of the printed circuit board makes it possible to easily connect the main power plug connectors to the housing plug connectors while minimizing a short circuit risk. The arrangement of the main power plug connectors as a bundle makes it possible to easily connect them to a minimized main power contra plug.

The housing plug connectors may be slot-shaped and may extend in an axial direction of the compressor housing. The housing plug connectors may be slanted with respect to the radial direction of the compressor housing so as to match to the blade shaped plug connectors.

Preferably, the compressor housing is provided with six housing plug connectors each of which is a connector to a lead wire.

Furthermore, the printed circuit board is provided with at least one track for connecting each of the main power plug connectors to the respective one of the housing plug connectors. In an exemplary embodiment of the compressor housing, the printed circuit board is provided with three tracks for connecting six plug connectors. Furthermore, the printed circuit board may be ring-shaped and disposed coaxially with the compressor wheel and between a volute of the compressor housing and an inlet of the compressor housing.

In a further exemplary embodiment a turbocharger comprises an electric motor for driving a compressor wheel accommodated in a compressor housing, said electric motor being supplied with electric power through at least one motor plug connector, and further comprises a turbine housing for accommodating a turbine wheel driven by exhaust gas, a center housing for accommodating a shaft and the electric motor, wherein the shaft serves as a rotor of the electric motor and extends from the turbine wheel through a journal bearing and through the electric motor to the compressor wheel, and wherein the compressor wheel is driven by the turbine wheel via the shaft and can also be driven by the electric motor, wherein said motor plug connector is disposed on an axial side of said electric motor, facing said compressor housing.

Alternatively or additionally, the compressor housing further comprises at least one main power plug connector connectable to an electric power source and at least one housing plug connector electrically connected to a respective one of the at least one main power plug connector for supplying said electric motor with electric power, wherein said housing plug connector is disposed on an axial side of said compressor housing, facing said electric motor.

Summarily, a turbocharger may comprise a compressor housing having any of the above described features of a compressor housing, an electric motor having any of the above described features of an electric motor as well as any features of an above described turbocharger. Thus, a turbocharger is provided, in which the power supply to the electric motor takes the following path: from the power source to the main power plug connector arranged on the compressor housing, passing through the compressor housing by means of the printed circuit board and then from the housing plug connectors to the motor plug connectors attached on the axial side of the motor, and finally to the stator of the electric motor.

Other features and advantages of the invention will become apparently from the description that follows with reference being made to the enclosed drawings, in which:

FIG. 6 is a rear view of the printed circuit board showing the arrangement of the main power connectors.

FIG. 7 is a frontal view of the printed circuit board showing the arrangement of the housing plug connectors.

FIG. 8 is several sectional views through the printed circuit board illustrating the connection of the main power plug connectors to the respective housing plug connectors via respective tracks.

Figure 1:
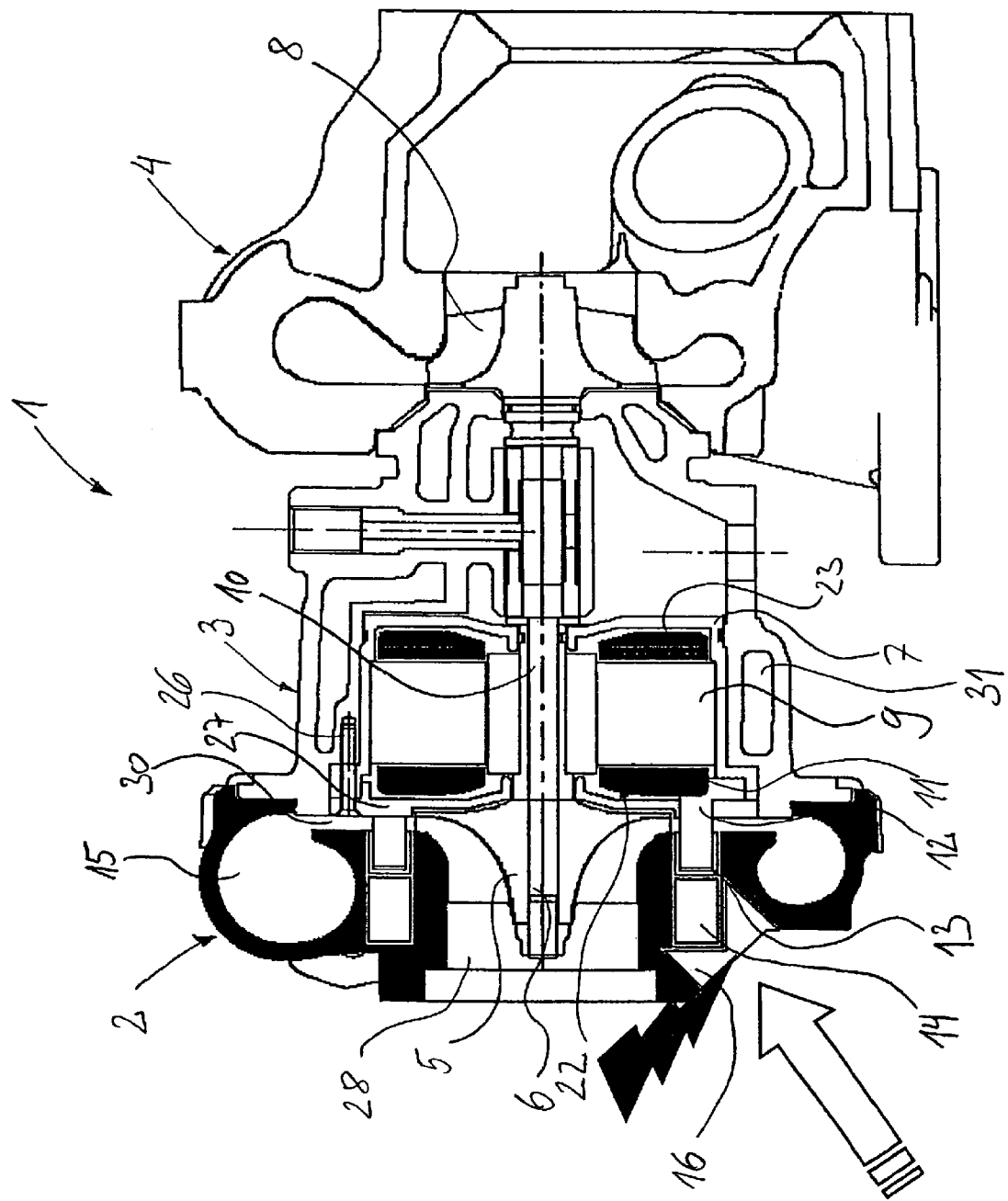
FIG. 1 is a sectional view of a turbocharger having an electric motor and a compressor housing according to an exemplary embodiment of the invention.

An electrically assisted turbocharger according to the exemplary embodiment shown in FIG. 1 comprises a turbine housing 4 for accommodating a turbine wheel 8, a center housing 3 for accommodating an electric motor cartridge 7 and a compressor housing 2 for accommodating a compressor wheel 5. A shaft 6 extends through the center housing 3 and the electric motor cartridge 7 accommodated therein so as to connect the compressor wheel 5 to the turbine wheel 8.

Generally, the compressor wheel 5 is driven by the turbine wheel 8 due to the exhaust gas flowing through an inlet and a volute of the turbine housing thus driving the turbine wheel 8. However, when the energy of the exhaust gas is low the driving of the compressor wheel 5 is assisted by the electric motor 21 which needs a power supply.

The electric motor 21 has a stator 9 and a rotor 10 wherein the latter may be provided in form of the shaft 6 itself. According to this embodiment the electric motor 21 is accommodated in an electric motor cartridge 7 which is, as a prefabricated assembly, slid over the shaft 6 into the center housing 3 when assembling the turbocharger.

The electric motor cartridge 7 has a cylindrical shape and has an axial side 24 facing the compressor housing 2. When assembling the turbocharger 1, the compressor wheel 5 is slid over the shaft 6 and inserted into a recessed portion 29 of the axial side 24 of the cartridge 7. The recessed portion 29 is surrounded by a ring projection 27 of the axial side 24. Since the compressor wheel 5 is partly concave-shaped and is very near to the cartridge 7, the recessed portion 29 has a convex-shaped portion 25. The motor cartridge 7 is fixed to the center housing by means of bolts 26.

Six blade-shaped male motor plug connectors 12 are disposed on an axial side 22 of the electric motor 21 and are connected to respective coils 23 on the stator 9. The axial side 22 of the electric motor 21 is the side which is adjacent to the opening of the center housing 3 into which the cartridge 7 is to be inserted. The motor plug connectors 12 project through the ring projection 27 of the cartridge 7.

Figure 5:
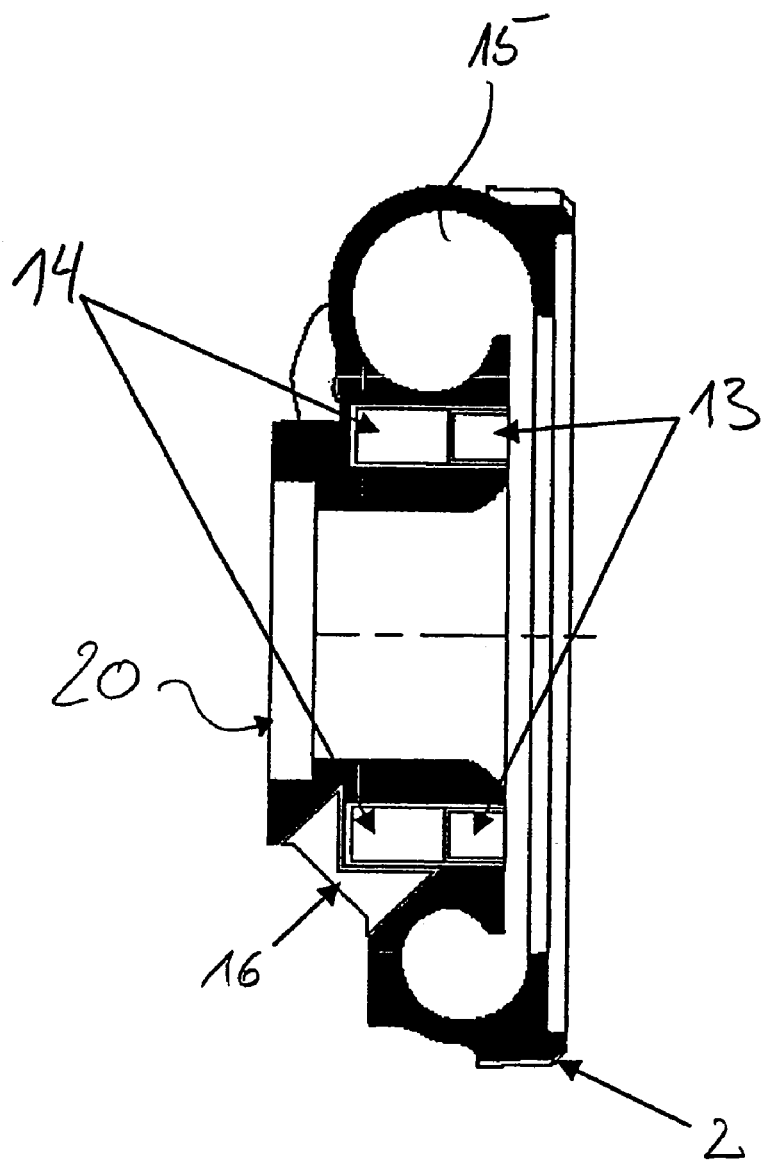
FIG. 5 is a sectional view of the compressor housing of FIG. 1 showing the arrangement of the main power plug connectors, the housing plug connectors and the printed circuit board.

FIG. 5 shows a compressor housing assembly comprising the compressor housing 2 and a printed circuit board 14 (PCB). The compressor housing 2 further accommodates the compressor wheel 5 in the compressor wheel chamber 28 and provides a compressor air inlet 20 for conveying the air from the inlet 20 through a radial air flow path 30 to the compressor volute 15. The radial air flow path 30 is formed between the electric motor cartridge 7 and the center housing 3, respectively, and the compressor housing 2.

Figure 4:
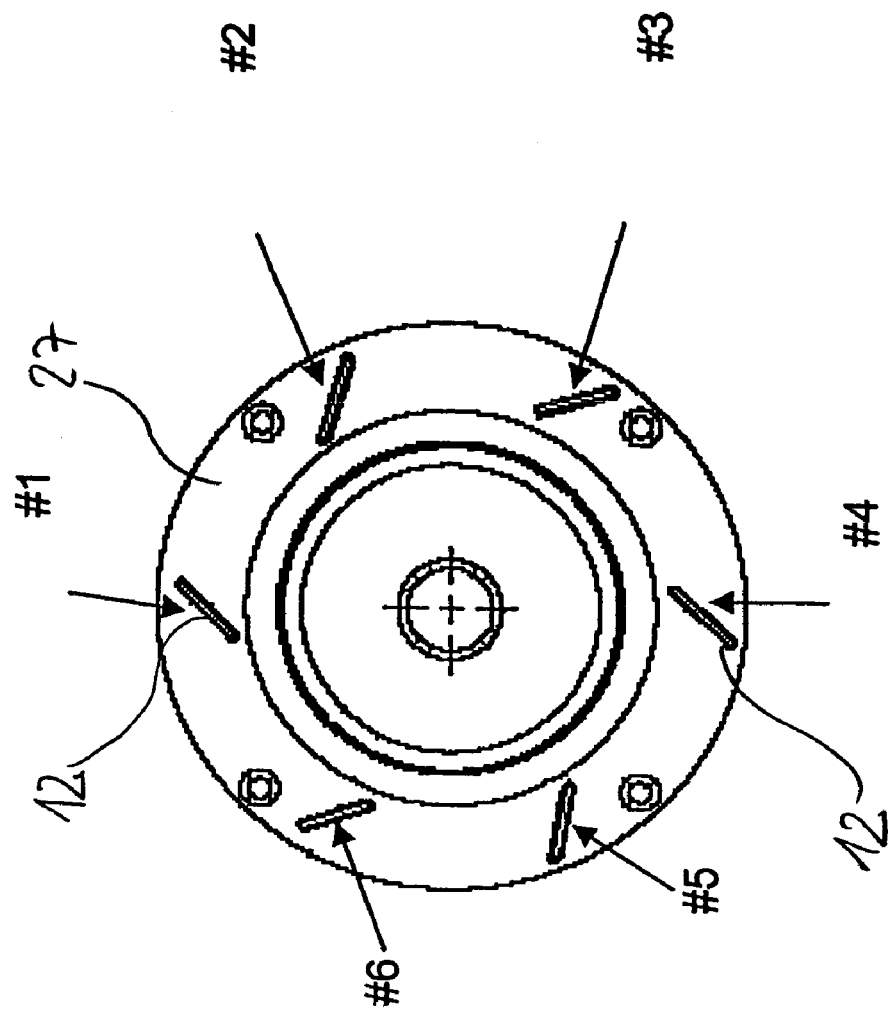
FIG. 4 is a frontal view of the electric cartridge assembly of FIG. 3 showing the arrangement of the motor plug connectors.
Figure 3:
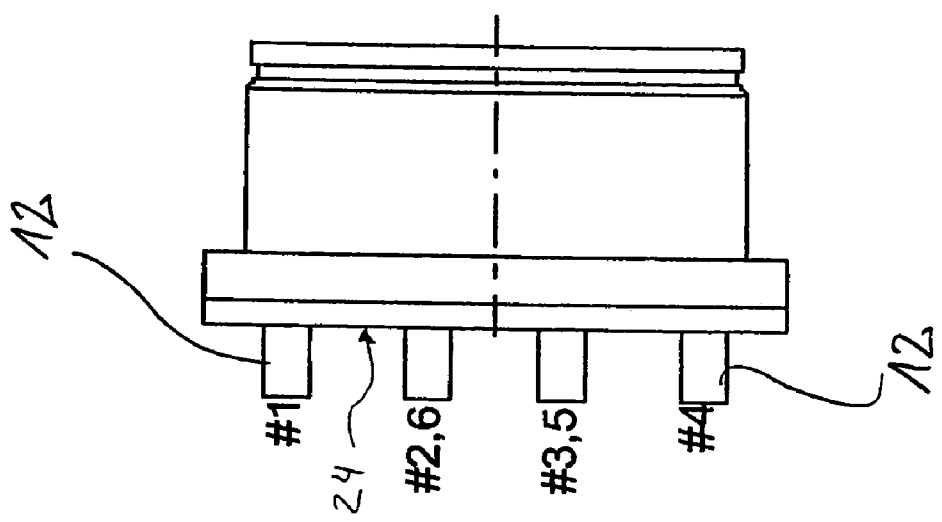
FIG. 3 is a side view of an electric cartridge assembly accommodating the electric motor and motor plug connectors and useable with the turbocharger of FIG. 1.

Since the motor plug connectors 12 project from the axial side of the electric motor 21 into the housing plug connectors 13 they cross the compressor air flow path 30 as can bee seen in FIG. 1. This can lead to a disturbing effect to the passing air or to a compressor efficiency drop. To minimize this effect, the six motor plugs 12 are blade-shaped and slanted with respect to the radial direction of the ring projection 27. In other words, the motor plugs are arranged such as to have a flow resistance as small as possible. Furthermore each one of the motor plug connectors 12 corresponds to one of six phases #1 to #6 of the electric motor 21 for supplying power to the respective coils 23 (see FIGS. 3 and 4).

FIG. 6 shows a rear view of the PCB 14 on which six main power plugs 16 are disposed, and FIG. 7 shows a frontal view of the PCB 14 on which six housing plugs 13 are disposed. The main power plugs 16 are arranged as male plugs in a bundle giving the possibility to supply power to the bundled main power plugs 16 through a compact main power contra plug (not shown) connected to a power source (not shown). Each of the main power plugs 16 corresponds to one of the phases #1 to #6.

The housing plugs 13 are arranged on the PCB 14 at radially equal intervals and slanted corresponding to the above described motor plugs 12. Each of the housing power plugs 13 corresponds to one of the six phases #1 to #6. The PCB 14 is arranged such in the compressor housing 2 that the housing plug connectors 13 open to the side of the compressor housing 2 to be connected to the center housing 3. Furthermore, the female housing plug connectors 13 do not project from the compressor housing 2 but are in alignment with the surface of the compressor housing 2 which is a part of above described radial air flow path 30. Thus, only the male motor plug connectors 12 are exposed to the compressed air in the radial air flow path 30 and the female housing plug connectors 13 contribute to a disturbance of the air flow only at a minimized level.

Figure 9:
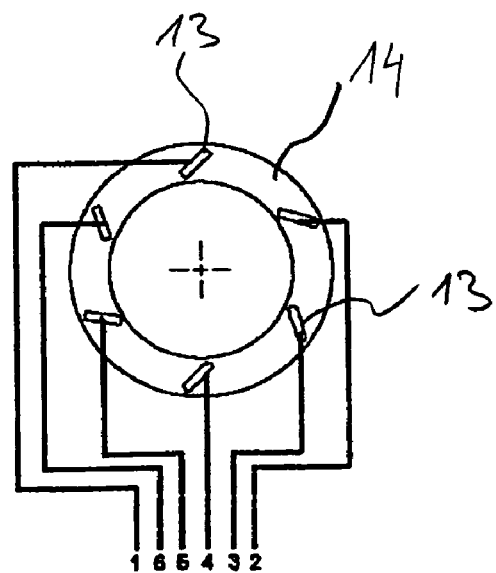
FIG. 9 is a schematic view of the lead wires of the printed circuit board.
Figure 10:
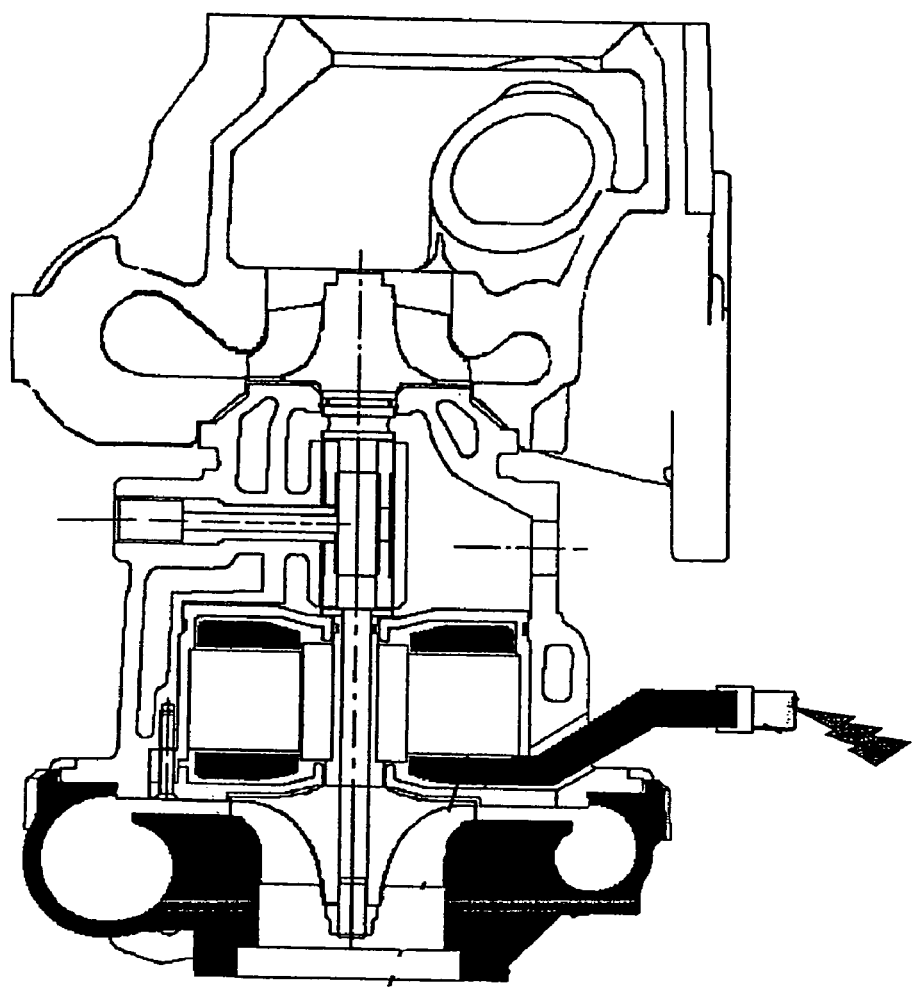
FIG. 10 is a sectional view of a turbocharger according to the prior art.
Figure 11:
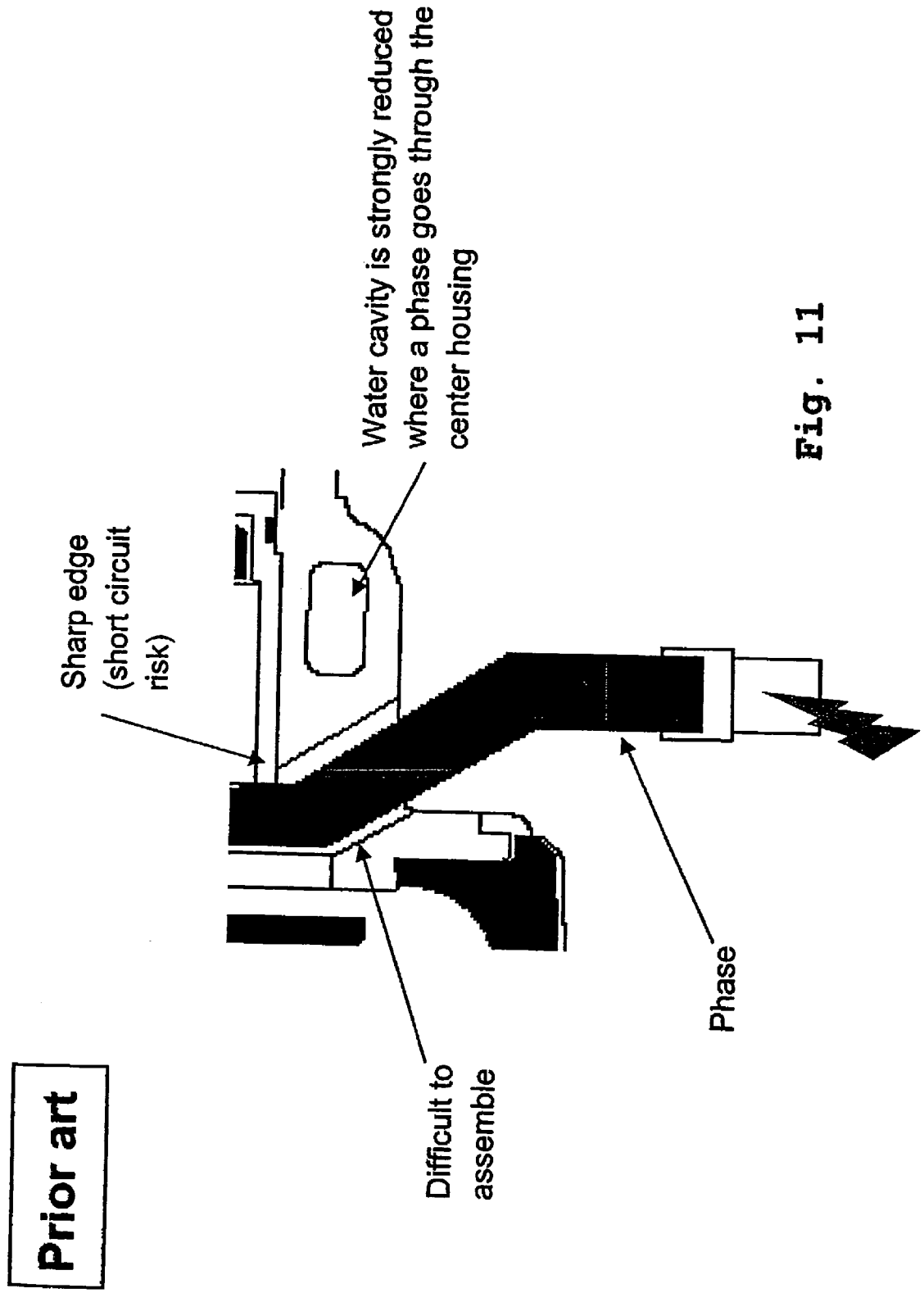
FIG. 11 is an enlarged portion of the electrical connection according to the prior art shown in FIG. 10.

The supply from the bundled main power plugs 16 to the housing plugs 13 is enabled by three tracks 17, 18 and 19 embedded in the PCB 14. FIG. 8 shows sectional views through the PCB 14 along virtual lines crossing the housing plugs #1 and #4, housing plugs #2 and #5 and housing plugs #3 and #6, respectively. From these figures and the schematic FIG. 9 it can be understood, that the main plug #4 is electrically connected to the housing plug #4 directly, the main plugs #3 and #5 are connected to the housing plugs #3 and #5 via the first track 17, respectively, the main plugs #2 and #6 are connected to the housing plugs #2 and #6 via the second track 18, respectively, and that the main track #1 is connected to the housing plug #1 via the third plug 19. Such an arrangement allows a minimized space for the PCB and reduced short circuit risk of the electrical connection between the plugs.

As can be seen from FIG. 1, the main power plugs 16 are arranged with respect to the compressor housing 2 at an area where the compressor volute 15 has a reduced dimension which provides more space for the main power connection.

Figure 2:
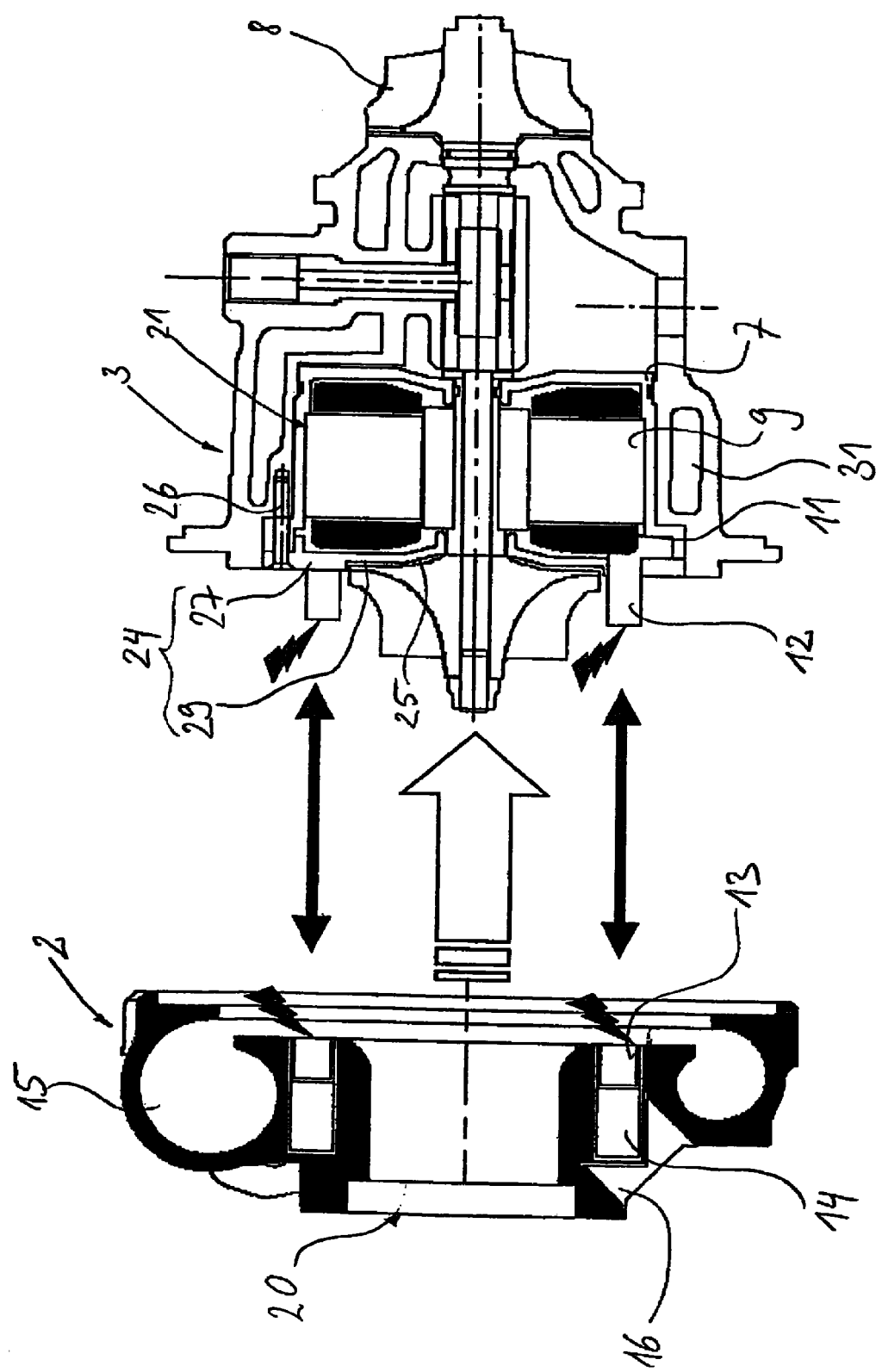
FIG. 2 is a sectional view of the turbocharger of FIG. 1 in a state in which the compressor housing is not mounted to the center housing.

With an arrangement as described above it is possible to easily assemble the turbocharger, as can be see from FIG. 2. According to what is shown in FIG. 2, after sliding the electric motor cartridge 7 and the compressor wheel 5 over the shaft 6, the compressor housing assembly can easily be mounted on the center housing 3. Therefore, the compressor housing 2 is attached to the center housing 3 by plugging the female housing plug connectors 13 of the center housing 3 onto the male motor plug connectors of the electric motor 21. Due to the plug-in of the plug connectors 12, 13 the compressor housing 2 is at least radially fixed to center housing 3 while simultaneously creating an electrical connection of the lead wires of the electric motor 21 to the lead wires of the PCB 14 in the compressor housing 2. An axial fixation of the compressor housing 2 to the center housing 3 may be established by bolts or other fixation means.

Furthermore, with such an arrangement, the lead wires of the electric motor do not have to be threaded each through a hole in the center housing 3. This makes the assembly easy, eliminates the presence of sharp edges which may contribute to short circuit risk and there are no lead wires which need to pass the water cavity 31 of the center housing 3. Therefore, the water cavity 31 is not affected by any lead wires and can be designed appropriate for a good cooling performance of the electric motor 21.

The integration of the PCB in the compressor housing is compatible with p-mold but also with die-cast one piece processes which is advantageous in view of the production costs.

Furthermore, a single main connector can be used for power supply and as a speed sensor, if required. This decreases the number of elements and leads to reduced production costs.

Additionally, the invention is compatible with GT (Garrett) and VNT (Variable Nozzle Turbine) e-Turbochargers and with turbocharger assembly processes.

The invention is not restricted to the above described embodiments and can be changed in various modifications.

For example, the electric motor may also be incorporated into the center housing without being arranged in a motor cartridge. The shape of the housing plugs and of the motor plugs may vary in view of fluidic aspects. For example, in the above embodiment only the male motor plugs are exposed to the air in the radial air flow path 30 since the female housing plugs do not project from the compressor housing 2. However, the plugs may also be arranged such that the female housing plugs project out of the compressor housing while providing an optimal fluidic shape and the male motor plugs may have a shape which does not need to be optimal in view of fluidic aspects since in this case they would not be exposed to the compressed air.

Additionally, the shape of the plugs may be reversed such that the motor plugs are female plugs while the housing plugs are male plugs.

The invention claimed is:

1. Electric motor configured for accommodation by a turbocharger center housing and configured to drive a compressor wheel, wherein the compressor wheel is accommodated in compressor housing and is driven in a rotational manner by the motor via a shaft supported by a bearing in the turbocharger center housing, said electric motor being supplied with electric power, characterized in that
 a circular printed circuit board is disposed coaxial to a volute of the compressor housing and along a line between said volute and the compressor wheel;
 motor plug connectors are arranged at intervals on a circle around a rotational axis of said electric motor; and
 said motor plug connectors are disposed on an axial side of said electric motor, facing said compressor housing, and configured to electrically connect to said circular printed circuit board.

2. Electric motor according to claim 1, wherein said motor plug connectors are formed as male plug connectors.

3. Electric motor according to claim 1, wherein said motor plug connectors are formed as female plug connectors.

4. Electric motor according to claim 1, wherein the motor plug connectors are blade-shaped and extend in an axial direction of the electric motor.

5. Electric motor according to claim 4, wherein the motor plug connectors are slanted with respect to the radial direction of the electric motor.

6. Electric motor according to claim 4, wherein the motor plug connectors are perpendicular to a radial direction of the electric motor.

7. Electric motor according to any of claims 4 to 6, provided with six motor plug connectors each of which is a connector to a lead wire.

8. Electric motor according to any of claims 1, 2, 3, 5 or 6, accommodated in an electric motor cartridge, wherein said motor plug connectors penetrate the electric motor cartridge.

9. Electric motor according to claim 1,
the shaft serving as a rotor of the electric motor and extending from a turbine wheel through the bearing and the center housing to the compressor wheel; wherein the compressor wheel is driven by the turbine wheel via the shaft and can additionally be driven by the electric motor.

10. Compressor housing for accommodating a compressor wheel drivable by an electric motor via a shaft connected to the compressor wheel, characterized in that said compressor housing comprises
a circular printed circuit board disposed along a line between a volute of said compressor housing and the compressor wheel;
at least one main power plug connector electrically connected to said circuit board and connectable to an electric power source; and
housing plug connectors electrically connected to said circular printed circuit board and electrically connected to at least one of said at least one main power plug connector for supplying said electric motor with electric power, wherein
said housing plug connectors are disposed on an axial side of said compressor housing, facing said electric motor, arranged by intervals on a circle around an axial axis passing through the center of the compressor housing.

11. Compressor housing according to claim 10, wherein said housing plug connectors are formed as female plug connectors.

12. Compressor housing according to claim 10, wherein said housing plug connectors are formed as male plug connectors.

13. Compressor housing according to claim 11 or 12, wherein said at least one main power plug connector is connected to at least one of said housing plug connectors via the printed circuit board.

14. Compressor housing according to claim 13, wherein a plurality of main power plug connectors is arranged as a bundle on the side of the printed circuit board opposite to the side where the housing plug connectors are disposed.

15. Compressor housing according to claim 14, wherein the housing plug connectors are slot-shaped and extend in an axial direction of the compressor housing.

16. Compressor housing according to claim 15, wherein the housing plug connectors are slanted with respect to the radial direction of the compressor housing.

17. Compressor housing according to claim 15, wherein the housing plug connectors are perpendicular to the radial direction of the compressor housing.

18. Compressor housing according to any of claims 15 to 17, provided with six housing plug connectors each of which is a connector to a lead wire.

19. Compressor housing according to any of claims 14 to 17, wherein the printed circuit board is provided with at least one track for connecting each of the main power plug connectors to the respective one of the housing plug connectors.

20. Compressor housing according to claim 19, wherein the printed circuit board is provided with three tracks.

21. Turbocharger comprising an electric motor for driving a compressor wheel accommodated in a compressor housing, said electric motor being supplied with electric power through motor plug connectors, the turbocharger further comprising
a turbine housing for accommodating a turbine wheel driven by exhaust gas;
a center housing for accommodating a shaft and the electric motor, the shaft serving as a rotor of the center housing and extending from the turbine wheel through a journal bearing and the electric motor to the compressor wheel; wherein the compressor wheel is driven by the turbine wheel via the shaft and can additionally be driven by the electric motor, characterized in that
said motor plug connectors are disposed on an axial side of said electric motor, facing said compressor housing wherein said motor plug connectors are arranged at intervals on a circle around a rotational axis of the electric motor and configured to electrically connect with a circular printed circuit board disposed along a line between a volute of said compressor housing and the compressor wheel.

22. Turbocharger according to claim 21, wherein said motor plug connectors are formed as male plug connectors.

23. Turbocharger according to claim 21, wherein said motor plug connectors are formed as a female plug connector.

24. Turbocharger according to claim 21, wherein the motor plug connectors are blade-shaped and extend in an axial direction of the electric motor.

25. Turbocharger according to claim 24, wherein the motor plug connectors are slanted with respect to a radial direction of the electric motor.

26. Turbocharger according to claim 24, wherein the motor plug connectors are perpendicular to a radial direction of the electric motor.

27. Turbocharger according to any of claims 24 to 26, provided with six motor plug connectors each of which is a connector to lead wire.

28. Turbocharger according to any of the claims 21 to 23 or 24 to 26, wherein the electric motor is accommodated in an electric motor cartridge, wherein said motor plug connectors penetrate the electric motor cartridge.

29. Turbocharger comprising a compressor housing for accommodating a compressor wheel drivable by an electric motor, further comprising
a turbine housing for accommodating a turbine wheel driven by exhaust gas;
a center housing for accommodating a shaft and the electric motor, the shaft serving as a rotor of the electric motor and extending from the turbine wheel through a journal bearing and the electric motor to the compressor wheel; wherein the compressor wheel is driven by the turbine wheel via the shaft and also configured to alternately be driven by the electric motor, characterized in that
said compressor housing further comprises
a circular printed circuit board disposed along a line between a volute of said compressor housing and the compressor wheel;
at least one main power plug connector electrically connected to said circuit board and connectable to an electric power source; and housing plug connectors electrically connected to said circular printed circuit board and electrically connected to at least one of the at least one main power plug connector for supplying said electric motor with electric power, wherein said housing plug connectors are disposed on an axial side of said compressor housing, facing said electric motor, arranged by intervals on a circle around an axial axis passing through the center of the compressor housing.

30. Turbocharger according to claim 29, wherein said housing plug connectors are formed as female plug connectors.

31. Turbocharger according to claim 29, wherein said housing plug connectors are formed as male plug connectors.

32. Turbocharger according to claim 30 or 31, wherein said at least one main power plug connector is connected to said housing plug connectors via the printed circuit board.

33. Turbocharger according to claim 29, wherein said housing plug connectors are arranged by equal intervals.

34. Turbocharger according to claim 33, wherein a plurality of main power plug connectors is arranged as a bundle on the side of the printed circuit board opposite to the side where the housing plug connectors are disposed.

35. Turbocharger according to claim 34, wherein the housing plug connectors are slot-shaped and extend in an axial direction of the compressor housing.

36. Turbocharger according to claim 35, wherein housing plug connectors are slanted with respect to a radial direction of the compressor housing.

37. Turbocharger according to claim 35, wherein housing plug connectors are perpendicular to a radial direction of the compressor housing.

38. Turbocharger according to any of claims 35 to 37, provided with six housing plug connectors each of which is a connector to a lead wire.

39. Turbocharger according to any of claims 34 to 37, wherein the printed circuit board is provided with at least one track for connecting each of the main power plug connectors to the respective one of the housing plug connectors.

40. Turbocharger comprising a compressor housing for accommodating a compressor wheel drivable by an electric motor and an electric motor for driving a compressor wheel accommodated in a compressor housing, said electric motor being supplied with electric power through motor plug connectors, further comprising a turbine housing for accommodating a turbine wheel driven by exhaust gas;

a center housing for accommodating a shaft and the electric motor, the shaft serving as a rotor of the electric motor and extending from the turbine wheel through a journal bearing and the electric motor to the compressor wheel wherein the compressor wheel is driven by the turbine wheel via the shaft and also configured to alternately be driven by the electric motor, characterized in that said compressor housing further comprises at least one main power plug connector electrically connected to a circular printed circuit board and connectable to an electric power source; and housing plug connectors electrically connected to said printed circuit board and electrically connected to at least one of the at least one of the main power plug connector for supplying said electric motor with electric power, wherein said circular printed circuit board is disposed along a line between a volute of the compressor housing and the compressor wheel;

said housing plug connectors are disposed on an axial side of said compressor housing, facing said electric motor, and said motor plug connectors are disposed on an axial side of said electric motor, facing said compressor housing, arranged by intervals on a circle around an axial axis passing through the center of the compressor housing.

* * * * *